United States Patent [19]
Eggleston

[11] Patent Number: 5,988,205
[45] Date of Patent: Nov. 23, 1999

[54] ROTARY VALVE ACTUATOR WITH ZERO LOST MOTION UNIVERSAL CONNECTION

[75] Inventor: Philip Wayne Eggleston, Sherman, Tex.

[73] Assignee: Fisher Controls International, Inc., Clayton, Mo.

[21] Appl. No.: 08/845,617

[22] Filed: Apr. 25, 1997

[51] Int. Cl.⁶ .......................... F16K 31/126; F16K 31/52
[52] U.S. Cl. .............................. 137/315; 251/58; 251/292
[58] Field of Search ............................ 251/58, 229, 279, 251/291, 292; 137/315

[56] References Cited

U.S. PATENT DOCUMENTS

| | | |
|---|---|---|
| Re. 35,136 | 1/1996 | Hasegawa et al. .......................... 92/99 |
| 362,767 | 5/1887 | McNair . |
| 995,027 | 6/1911 | Mueller ................................... 251/292 |
| 1,878,569 | 9/1932 | Zolleis ..................................... 251/292 |
| 2,043,418 | 6/1936 | Newmark ................................. 251/291 |
| 2,190,117 | 2/1940 | Griffith ....................................... 200/58 |
| 2,251,481 | 8/1941 | Corbin, Jr. ................................. 251/58 |
| 2,293,269 | 8/1942 | Rufus ........................................ 137/21 |
| 2,296,213 | 9/1942 | Kretzschmar ............................... 267/1 |
| 2,305,099 | 12/1942 | Morris ........................................ 287/53 |
| 2,535,382 | 12/1950 | Bachli et al. .............................. 287/53 |
| 2,641,280 | 6/1953 | Fleischhauer .......................... 137/62.5 |
| 2,642,216 | 6/1953 | Carter ........................................ 226/116 |
| 2,707,966 | 5/1955 | Taplin .................................... 137/116.5 |
| 2,722,881 | 11/1955 | Sutterfield et al. .......................... 98/41 |
| 2,731,534 | 1/1956 | Hansen et al. ............................... 219/4 |
| 2,870,873 | 1/1959 | Mueller .................................... 188/33 |
| 2,878,701 | 3/1959 | Weersma ...................................... 81/71 |
| 3,011,758 | 12/1961 | McFarland, Jr. ......................... 251/331 |
| 3,070,029 | 12/1962 | Russell .................................... 103/150 |
| 3,082,792 | 3/1963 | Jenkins .................................... 137/790 |
| 3,084,901 | 4/1963 | Thorburn ................................... 251/61 |
| 3,195,418 | 7/1965 | Zukas ........................................ 91/416 |
| 3,204,920 | 9/1965 | Generke .................................... 251/58 |
| 3,224,345 | 12/1965 | Doetsch ........................................ 92/94 |
| 3,254,660 | 6/1966 | Ray ........................................... 137/66 |
| 3,275,286 | 9/1966 | Wood ........................................ 251/30 |
| 3,282,171 | 11/1966 | Tuckmantel ................................. 92/99 |

(List continued on next page.)

FOREIGN PATENT DOCUMENTS

| | | |
|---|---|---|
| 0 192 973 | 9/1986 | European Pat. Off. . |
| 2250058 | 5/1975 | France . |
| 2 509 008 | 1/1983 | France . |
| 2133237 | 1/1973 | Germany . |
| 2 343 069 | 2/1975 | Germany . |
| 3024439 | 1/1982 | Germany . |
| 42 44 573 | 7/1994 | Germany . |
| 4420822 | 12/1995 | Germany . |
| 56-63164 | 5/1981 | Japan . |
| 958832 | 5/1964 | United Kingdom . |
| 1 595 576 | 7/1969 | United Kingdom . |

OTHER PUBLICATIONS

Fisher Controls, "Type 657 and 667 Diaphragm Actuators," Bulletin 61.1:657, Apr. 1992.

(List continued on next page.)

*Primary Examiner*—George L. Walton
*Attorney, Agent, or Firm*—Marshall, O'Toole, Gerstein, Murray & Borun

[57] ABSTRACT

A rotary valve actuator with movable actuator linkage maintained in a constant "pull-pull" tension, includes a sliding canister, rotatable lever, and a return spring substantially aligned in-line with each other. The linear motion of the canister in response to an expanding and contracting pressurized bladder is converted through chain linkage into rotary lever motion. The return spring is connected through respective chain linkage to the lever so the pulling tension of the spring/lever linkage rotates the lever and maintains tension on both chain linkages. Adjustable travel stops are provided. In an alternate embodiment the return spring chain linkage is configured at right angles to the linear movement of the canister. A zero lost motion universal connection includes a splined sleeve matching the splined valve shaft and inserted into a lever bore. A set screw with a flat front end is threaded into the lever and tightened against a flat surface on the splined sleeve exterior.

7 Claims, 9 Drawing Sheets

U.S. PATENT DOCUMENTS

| | | |
|---|---|---|
| 3,395,886 | 8/1968 | Fawkes .................................. 251/229 |
| 3,434,395 | 3/1969 | Londal ........................................ 92/6 |
| 3,452,961 | 7/1969 | Forsman ................................... 251/31 |
| 3,486,731 | 12/1969 | Magnani et al. ......................... 251/58 |
| 3,513,059 | 5/1970 | Prohaska ................................ 156/446 |
| 3,516,442 | 6/1970 | Munroe ............................ 137/625.66 |
| 3,575,378 | 4/1971 | Fawkes .................................. 251/229 |
| 3,588,036 | 6/1971 | Harter ...................................... 251/61 |
| 3,610,571 | 10/1971 | Cisco .................................... 251/63.6 |
| 3,717,322 | 2/1973 | Bernard .................................... 251/61 |
| 3,719,199 | 3/1973 | Mentink .................................. 137/269 |
| 3,719,343 | 3/1973 | Werra .................................... 251/61.1 |
| 3,804,364 | 4/1974 | De Lepeleire ............................ 251/43 |
| 3,814,119 | 6/1974 | Bertrand et al. .......................... 137/86 |
| 3,817,452 | 6/1974 | Dean, Jr. ................................... 236/49 |
| 3,845,783 | 11/1974 | De Lepeleire .......................... 137/504 |
| 3,862,739 | 1/1975 | Fujiwara ................................. 251/134 |
| 3,945,565 | 3/1976 | Lynch et al. .............................. 236/49 |
| 3,958,592 | 5/1976 | Wells et al. ............................ 137/315 |
| 3,963,377 | 6/1976 | Elliot et al. ................................ 417/90 |
| 3,978,922 | 9/1976 | Johnson et al. ...................... 166/224 A |
| 3,980,135 | 9/1976 | Garrett ................................ 166/224 A |
| 3,982,558 | 9/1976 | Ochs ...................................... 137/455 |
| 4,003,547 | 1/1977 | Snyder et al. ............................ 251/31 |
| 4,014,386 | 3/1977 | Johnson et al. ......................... 166/321 |
| 4,017,025 | 4/1977 | Dravnieks et al. ........................ 236/49 |
| 4,027,692 | 6/1977 | Bouteille et al. ........................ 137/270 |
| 4,111,221 | 9/1978 | Olsen ........................................ 137/67 |
| 4,111,608 | 9/1978 | Elliot et al. .............................. 417/112 |
| 4,147,094 | 4/1979 | Iguchi ........................................ 92/48 |
| 4,151,819 | 5/1979 | Inada et al. ........................... 123/119 A |
| 4,178,938 | 12/1979 | Au ...................................... 128/207.15 |
| 4,225,110 | 9/1980 | Akkerman et al. ........................ 251/58 |
| 4,240,335 | 12/1980 | Stucka et al. .............................. 92/96 |
| 4,261,546 | 4/1981 | Cory et al. ................................ 251/58 |
| 4,278,108 | 7/1981 | Casacci .................................. 137/613 |
| 4,295,630 | 10/1981 | Card et al. ................................ 251/14 |
| 4,340,079 | 7/1982 | Smith et al. ............................ 137/207 |
| 4,364,414 | 12/1982 | Bouteille et al. ................. 137/624.14 |
| 4,434,707 | 3/1984 | Takeuchi et al. ..................... 91/376 R |
| 4,441,519 | 4/1984 | Terral ....................................... 137/15 |
| 4,445,529 | 5/1984 | Lagarelli ................................. 251/292 |
| 4,480,811 | 11/1984 | Card et al. ................................ 251/14 |
| 4,527,769 | 7/1985 | Stogner et al. ........................... 251/14 |
| 4,545,433 | 10/1985 | Wambaugh ............................ 166/105 |
| 4,546,953 | 10/1985 | Vinoiguerra et al. ..................... 251/58 |
| 4,569,378 | 2/1986 | Bergandy ................................ 141/266 |
| 4,572,237 | 2/1986 | Thompson ........................... 137/487.5 |
| 4,582,082 | 4/1986 | Tosseghini .............................. 137/270 |
| 4,604,944 | 8/1986 | Tsubouchi ................................ 92/98 D |
| 4,716,922 | 1/1988 | Camp ..................................... 251/291 |
| 4,732,189 | 3/1988 | Jones et al. ............................. 137/220 |
| 4,783,046 | 11/1988 | Young et al. ........................... 251/61.4 |
| 4,787,413 | 11/1988 | Saggers .................................. 137/494 |
| 4,809,733 | 3/1989 | Hawkins ............................... 251/62 X |
| 4,876,766 | 10/1989 | Cohen .................................... 251/291 |
| 4,877,058 | 10/1989 | Stoll ................................. 137/625.48 |
| 4,889,153 | 12/1989 | Zepernick et al. ...................... 137/269 |
| 4,925,498 | 5/1990 | Kemmler ............................... 137/382 |
| 4,930,555 | 6/1990 | Rudick ..................................... 141/98 |
| 4,977,922 | 12/1990 | McWilliams ........................... 137/269 |
| 4,986,299 | 1/1991 | Schultz .................................. 137/269 |
| 5,007,330 | 4/1991 | Scobie et al. ............................. 92/120 |
| 5,016,856 | 5/1991 | Tartaglino ................................ 251/61 |
| 5,029,806 | 7/1991 | Huo-Lien et al. ......................... 251/14 |
| 5,069,248 | 12/1991 | Gill ........................................ 137/613 |
| 5,086,801 | 2/1992 | Peacock et al. .......................... 137/12 |
| 5,101,853 | 4/1992 | Mailliet et al. ......................... 137/242 |
| 5,190,263 | 3/1993 | Roberts .................................... 251/60 |
| 5,236,006 | 8/1993 | Platusich et al. ....................... 137/375 |
| 5,275,014 | 1/1994 | Solomon .............................. 62/324.1 |
| 5,277,397 | 1/1994 | Tartaglino ................................ 251/61 |
| 5,279,325 | 1/1994 | Kaspers ................................. 137/270 |
| 5,305,987 | 4/1994 | Baumann ............................... 251/298 |
| 5,337,797 | 8/1994 | Janssen et al. .......................... 141/206 |
| 5,348,270 | 9/1994 | Dinh ..................................... 251/61.1 |
| 5,357,999 | 10/1994 | Loth et al. ............................ 251/62 X |
| 5,370,147 | 12/1994 | Brusse et al. ............................. 137/15 |
| 5,469,774 | 11/1995 | Kaspers .................................... 91/54 |
| 5,487,527 | 1/1996 | Eggleston ................................. 251/62 |
| 5,507,467 | 4/1996 | Mott ......................................... 251/58 |

OTHER PUBLICATIONS

Fisher Controls "470 Series Piston Actuators," Billetin 61.2:470, Jul. 1993.

Fisher Controls, "Type 585 and 585R Piston Actuators," Bulletin 61.2:585, Jul. 1993.

Compteurs Schlumberger, Division Controle Industriel, Technical File, FT50–37/C, "Servo–Moteur Pneumatique Reversible, Type KW," pp. 1–8, Mai 1976 (Translation supplied).

ROTARY VALVE ACTUATOR WITH ZERO LOST MOTION UNIVERSAL CONNECTION

This invention relates generally to fluid flow control devices and in particular to actuators for fluid flow valves.

BACKGROUND OF THE INVENTION

A variety of fluid flow control valves and corresponding valve actuators are utilized for on/off control or throttling the flow of fluid, such as in a gas or oil pipeline system, or in other process fluid systems. The fluid flow control valves are typically sliding stem control valves or rotary action control valves and are operated by a valve actuator such as a pneumatic piston or diaphragm actuator responding to the output of a valve positioner or valve controller instrument for accurate throttling control of the valve.

In the case of rotary action control valves, these units typically employ a flow control member in the form of a rotatable ball, rotatable ball segment, or a rotatable butterfly element. The rotation of the flow control element opens and closes the valve gate or plug.

Valve actuators for controlling such rotary action control valves typically employ a movable diaphragm connected to a rod at the diaphragm center. Moving the diaphragm displaces the rod linearly and thus requires a linear to rotary action translation. A rotational link arm has one end fixed to the valve rotary shaft and the other link arm end is coupled to the diaphragm rod. Linear movement of the diaphragm rod moves the link arm and thereby actuates a rotational movement in the valve shaft which is ultimately connected to the rotatable flow control element in the fluid control valve.

Such presently available rotary valve actuators employ many components, several of which require time consuming and expensive machining during manufacture. A manufacturer and users of rotary valve actuators therefore must inventory a large number of parts, and also must inventory an increasing number of expensive, machined spare parts for repair and replacement.

For instance, with presently available rotary valve actuators, it is desired to provide one basic rotary actuator model for several different sizes of rotary valves. However, each valve respectively has different valve shaft diameters and different splines on the various valve shafts. This requires each "basic" rotary valve actuator to have a respective matching link arm especially made for each valve shaft, so that now the "basic" rotary actuator becomes very different from each other. Therefore, a variety of costly matching lever arms must be manufactured and stocked, which tends to defeat the attempt to provide one "basic" rotary actuator unit for several different sizes of rotary valves.

It is desired therefore to reduce the number of parts as well as to reduce the number of time consuming and expensive machined parts in a rotary valve actuator so as to thereby reduce manufacturing costs and inventory requirements both for the manufacturer and the user. In addition, it is further desired to provide a rotary valve actuator of reduced size and weight, and one having the capability of actuating a variety of rotary valves to reduce the number of rotary valve actuators required.

SUMMARY OF THE INVENTION

In accordance with the principles of the present invention, there is provided a rotary valve actuator with a universal connection to a splined valve shaft to enable one size rotary actuator to adapt to several sizes of fluid control valves each having different sizes of respective valve shafts. In a rotary valve actuator according to the invention, a rotatable lever includes a hollow bore for receiving a splined valve shaft. A splined sleeve has an exterior surface matching the surface contour of the lever bore, and interior splines matching the splines on the valve shaft. The splined sleeve is adapted in size to mount onto the splined valve shaft end, and to be insertable into the lever bore. A threaded set screw threadably engages the lever and can be tightened against the splined sleeve in the bore to lock the valve shaft to the rotatable lever.

Preferably, the splined sleeve includes a flat surface portion on the exterior and the set screw includes a flat front end which locks against the sleeve flat surface portion. A raised boss may be provided on the lever with a threaded aperture to accommodate the threaded set screw. Thus, with the splined sleeve placed on the splined valve shaft, the sleeve flat surface portion is aligned with the raised boss threaded aperture as the sleeve and shaft are inserted into the lever threaded bore so that the flat front end of the set screw can lockingly engage the sleeve flat surface portion.

Therefore, one size of rotatable lever can be provided for a rotary valve actuator able to handle several different sizes of rotary valves. Only a new splined sleeve may need to be matched to the respective splined valve shaft of the various rotary valves.

The universal connection for rotary valve actuators of this invention provides zero lost motion between the rotatable lever and the valve shaft. In addition, the following advantages are obtained over currently available rotary actuators:

1. Simplifies assembly of actuator to valve;
2. Reduces the total number of actuator parts;
3. One actuator fits several valve sizes;
4. Only need to stock one completely assembled actuator to cover several valve sizes;
5. Can be adapted to other types of connection, such as square, pinned, and a shaft with a flat;
6. Zero loss motion gives better valve control; and
7. Allows changes in existing valve mounting, but can be adapted to older style mounts.

In accordance with the principles of the present invention, there is provided a rotary valve actuator with movable actuator linkage maintained in a constant "pull-pull" tension. A rotary valve actuator of the present invention includes a sliding cylinder or canister operated by a pressurized bladder, enabling a rolling diaphragm bladder action to linearly move the sliding canister. A cylindrical shaped lever is attached by a flexible canister/lever linkage to the sliding canister on one side of the lever. The linear motion of the sliding canister and the resulting pulling tension of the canister/lever linkage is converted into a rotary motion of the lever about its cylindrical axis.

Opposed to the sliding canister and on the other side of the rotatable lever there is provided a return spring which is attached to the lever with a flexible spring/lever linkage. The spring is precompressed to a predetermined load so the pulling tension of the spring/lever linkage tends to rotate the lever in the direction of the spring, and at the same time pull an unoperated sliding canister towards the lever and against an adjustable, canister bottom travel stop.

When the pneumatic pressure is introduced into the bladder, the pressure will force the sliding canister away from the lever and thereby rotate the lever in the direction of the sliding canister. The top travel of the sliding canister is restricted by an adjustable, canister top travel stop that is aligned with a stop pawl extending from the lever. As the lever rotates, it comes into contact with the stop. As the sliding canister rotates the lever, this causes the spring to compress and resist the pull from the sliding canister. When the pressure is released from the bladder, the spring pulls the sliding canister back down against the canister bottom travel stop.

The respective linkage between the lever and the sliding canister on one side, and between the lever and the spring on the other side of the lever can be flexible or rigid in nature. Flexible linkage can be formed for instance of chain material, cables, etc. Rigid linkages can be formed of linked bars, rack and pinion members, etc. When using flexible linkage, the lever arm length is always the same distance from the center of the lever arm through its 90° rotation. In contrast, with rigid linkage, the lever arm length is reduced by 30° at the end of the lever arm travel. Also, the flexible linkage produces constant torque through the 90° rotation of the lever and is desired over rigid linkage which produces variable torque throughout the lever rotation.

A significant advantage is provided by the mounting of the rotating lever intermediate the sliding canister on one side and the return spring on the other side of the lever in a "pull-pull", constant tension configuration. With the spring being mounted separately from the sliding canister, this enables the lever arm to be shorter for the spring as compared to the lever arm for the sliding canister. A shorter lever arm reduces the spring travel and in turn reduces the spring height, making the actuator profile smaller, the actuator weight lighter, and the actuator construction less costly.

The pull-pull, constant tension valve actuator configuration of the present invention continually takes any lost motion out of the linkage connecting the sliding canister cylinder, rotating lever, and return spring. In contrast, in normal linkage configurations in actuators, continuous cycling of the movable actuator components causes wear and eventually an undesired lost motion condition is exhibited. In the present invention the pull-pull, constant tension feature between the sliding canister and the spring with the intermediate rotating lever not only eliminates the lost motion problem of prior actuators, but also eliminates the need for precision mated parts, since all mating parts are kept in tension.

In a preferred embodiment of the present invention, the sliding canister and spring are spaced 180° apart, in-line and resisting each other through the connecting linkage. The tension forces transmitted through the linkage of the sliding canister to the lever and from the lever to the spring linkage minimizes the load on the lever bearings and thereby minimizes bearing wear. Also, with the linkage in tension, the actuator housing is placed in compression, and the housing material in compression is more desirable than in tension. Also, with the housing material parts in compression only a minimum number of fasteners are required for reliably maintaining the housing parts assembled.

A return spring, spring end caps and spring linkage is preassembled to form a spring cartridge. The spring cartridge can then be mounted in the housing as a unitary unit. This insures that the spring linkage is not damaged when preloading the spring and insures good linkage alignment with the lever and also reduces user safety issues during assembly of the actuator components.

The linkage between the lever and the sliding canister is connected at the side wall of the sliding canister thereby simplifying the over all assembly. This connection reduces the number of parts required to carry the pulling load to the rotatable lever thereby reducing actuator size, weight and cost.

A valve positioner or a valve controller instrument is mountable directly onto the actuator. The use of a sliding canister enables the ease of providing manifolding air passageways from the bladder unit to the direct mounted valve positioner, which eliminates the need for exterior tubing interconnecting the positioner and actuator units.

In an alternative embodiment of the pull-pull, constant tension rotary valve actuator of the present invention, the return spring is mounted 90° to the center line of the sliding canister, with the same rotatable lever as in the prior mentioned in-line actuator embodiment. This alternative 90° embodiment of the pull-pull actuator of the present invention provides a more compact profile configuration than the in-line embodiment, and may be preferred for use with certain valve situations. The same pressure actuated bladder, sliding canister, rotating lever, and spring cartridge are utilized as in the in-line embodiment. Also, the same advantages of the in-line rotary actuator embodiment are obtained by this alternative 90° rotary actuator embodiment, except that because the spring is positioned 90° to the center line of the sliding canister, this tends to create a diagonal load on the lever bearings, which diagonal bearing load is not present in the in-line embodiment.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 8:
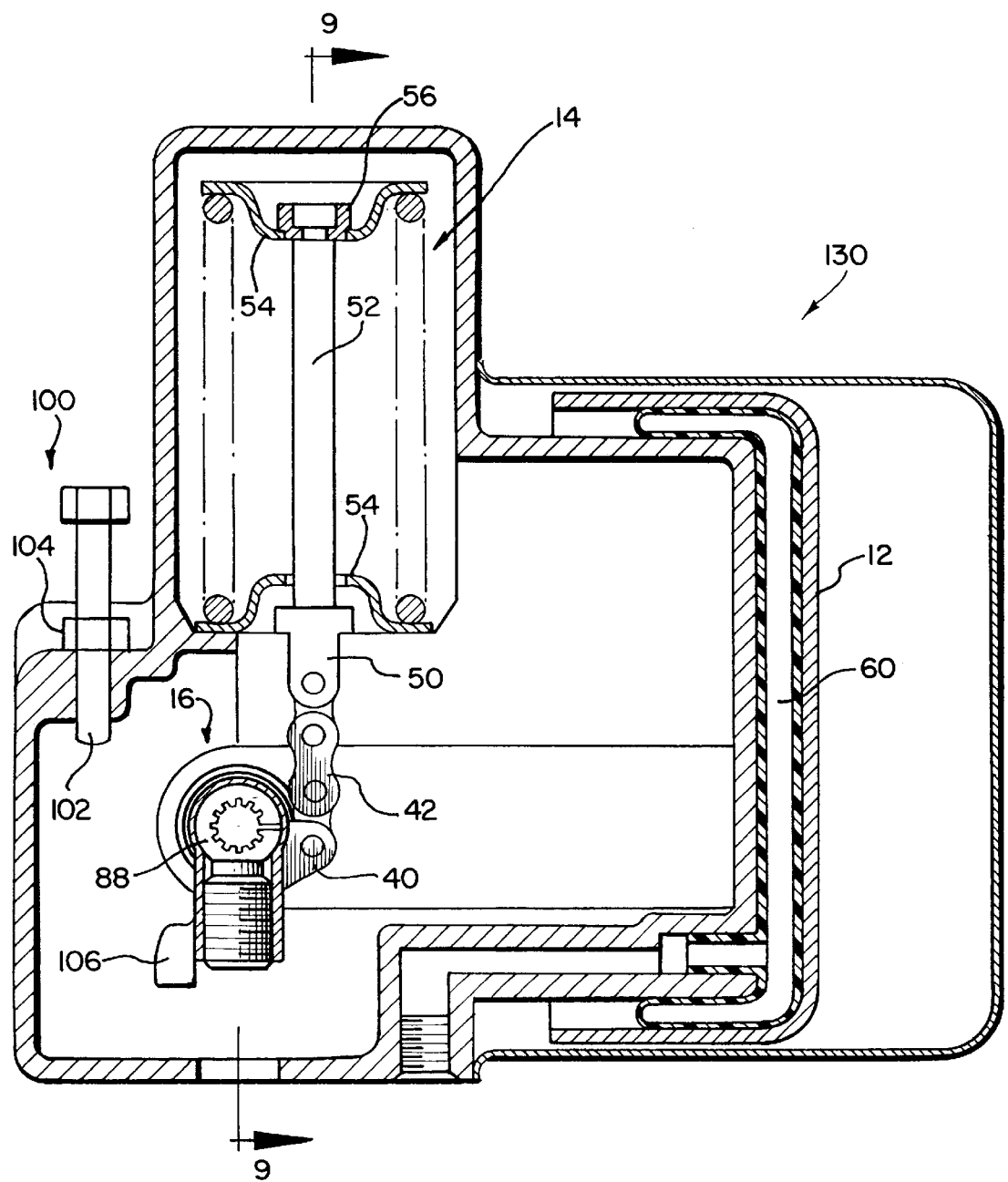
FIG. 8 is a sectional elevational view, partly fragmented, illustrating an alternative embodiment of a rotary valve actuator according to the present invention wherein the sliding canister and return spring are located 90° relative to each other.
Figure 9:
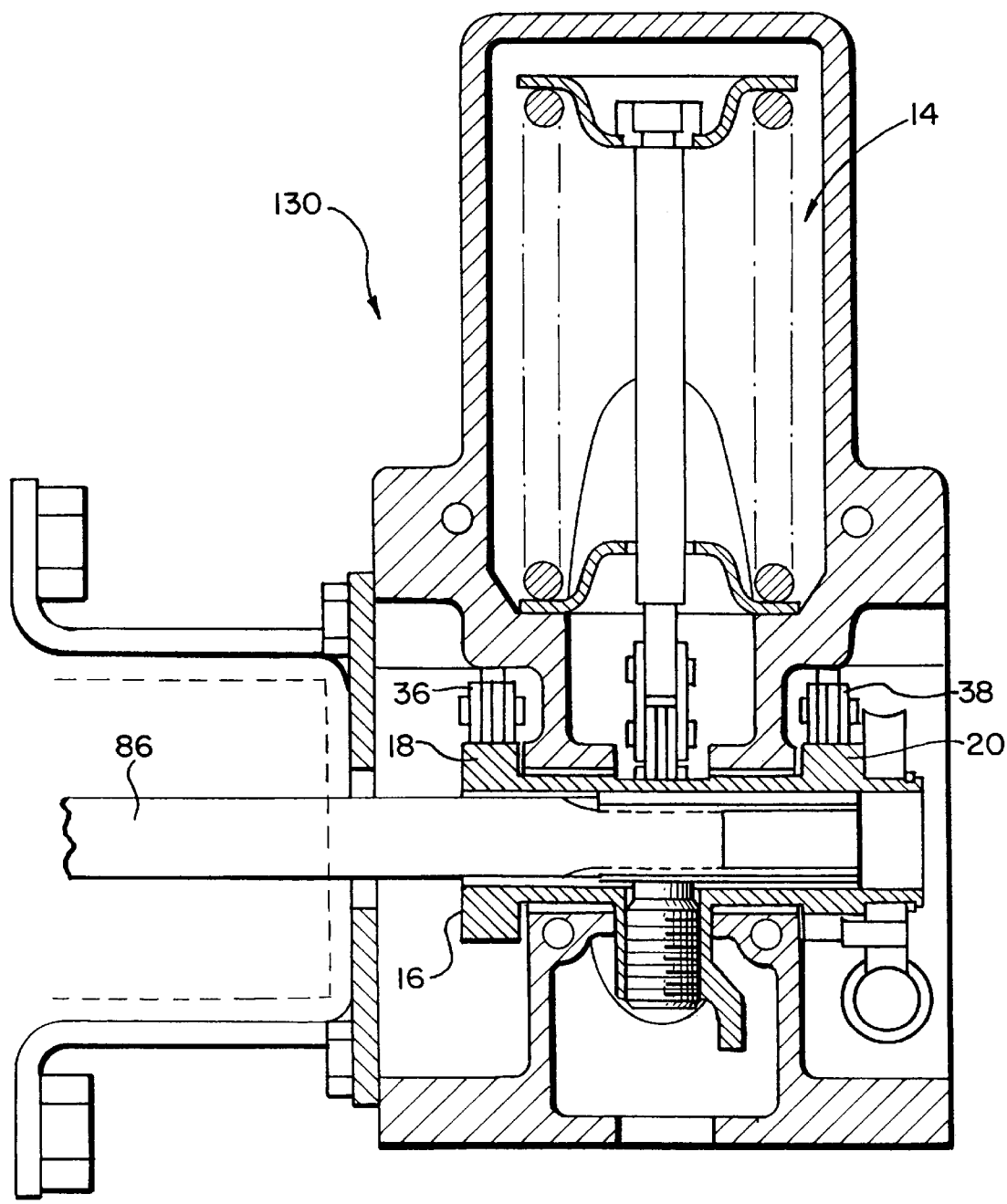
FIG. 9 is a sectional elevational view taken along section lines 9—9 of FIG. 8.

Referring now to the drawings, there is illustrated a rotary valve actuator for fluid control valves, wherein the actuator includes linear to rotary transformation in which tension is always maintained in the linkage between opposing actuating elements by enabling the actuating elements to pull against each other in a pull-pull, constant tension configuration. In particular, FIGS. 1–7 illustrate a rotary valve actuator wherein the pull-pull actuating elements are in an in-line configuration. FIGS. 8 and 9 illustrate a rotary valve actuator wherein the pull-pull actuating elements are in a right-angle configuration.

With reference to FIGS. 1–7, there is illustrated a rotary valve actuator 10 which includes a slidably movable canister 12, an opposite spring cartridge 14 and an intermediately coupled rotatable lever 16, such that the linkage coupling mechanism is always in pull-pull tension. That is, when the canister 12 is being moved in a linear manner oppositely away from the lever 16 in a pulling linkage manner, the opposite spring cartridge 14 is resisting this pulling action of the canister and is itself exerting a pulling force on the respective linkage coupling. Therefore, there is provided a unique "pull-pull" rotary valve actuator 10 which keeps the coupling or respective linkage always in tension.

Figure 5:
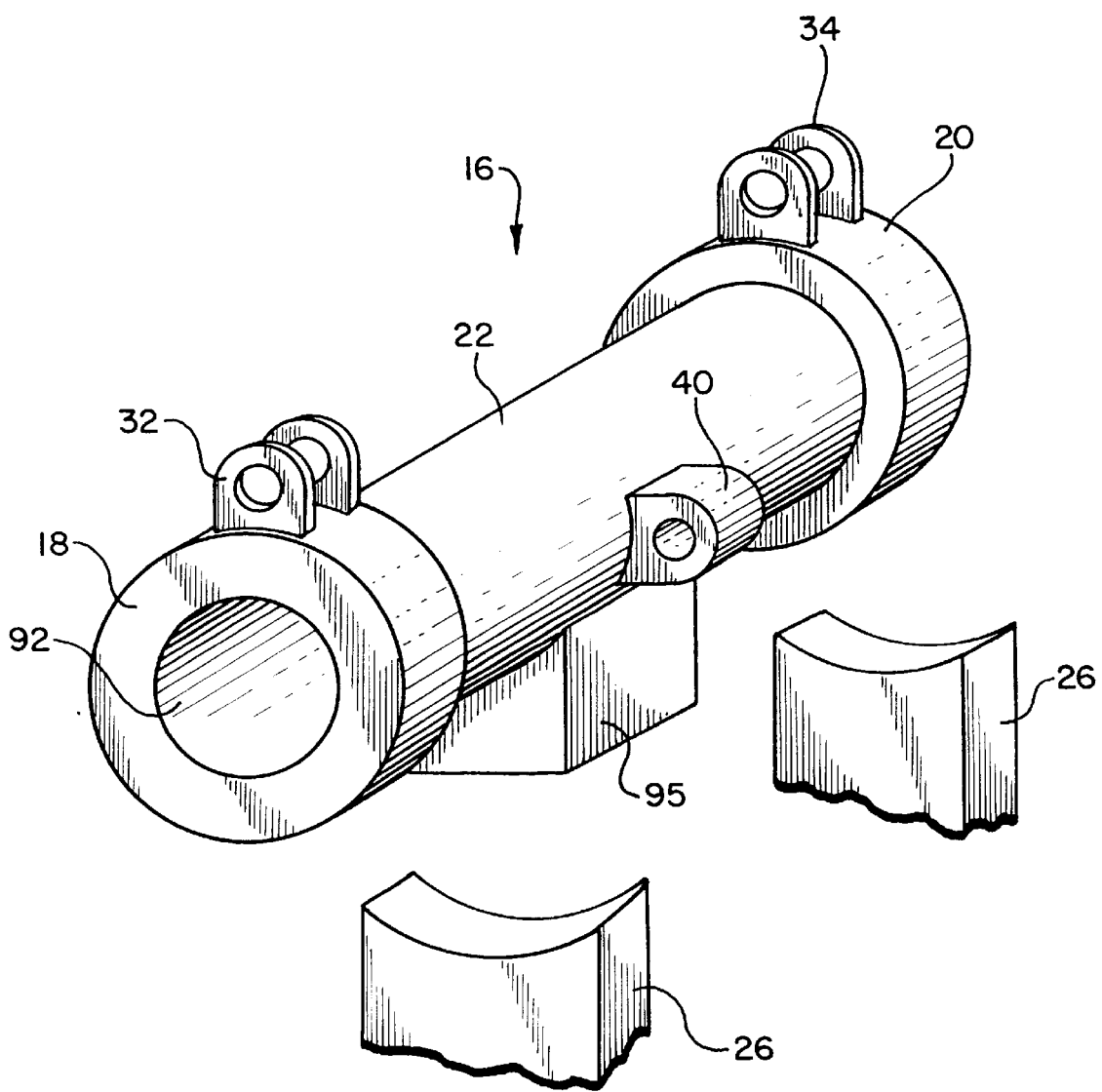
FIG. 5 is a perspective view illustrating a rotatable cylindrical lever utilized in the rotary valve actuator of FIG. 1.

The rotatable lever 16 is formed of a hollow hard metal such as steel, cylindrically shaped with opposite flange ends 18, 20 and an intermediate middle portion 22 as shown in FIG. 5. The lever 16 is rotatably mounted within a lower housing 24 and is supported on suitable bearings 25 (see FIG. 1) such that the lever middle portion 22 is supported on bearing support columns 26 in the frame 24. A pair of support columns 28 similar to columns 26 are also provided in an upper housing 30. As can be seen from FIG. 3, mounting of the lower housing 24 to the upper housing 30 captures the lever 16 between opposing support columns 26, 28 so as to rotatably mount the lever 16 within the rotary valve actuator 10. Instead of support columns, other lever support structure can be provided, such as cast-in wall sections in the housing.

Figure 1:
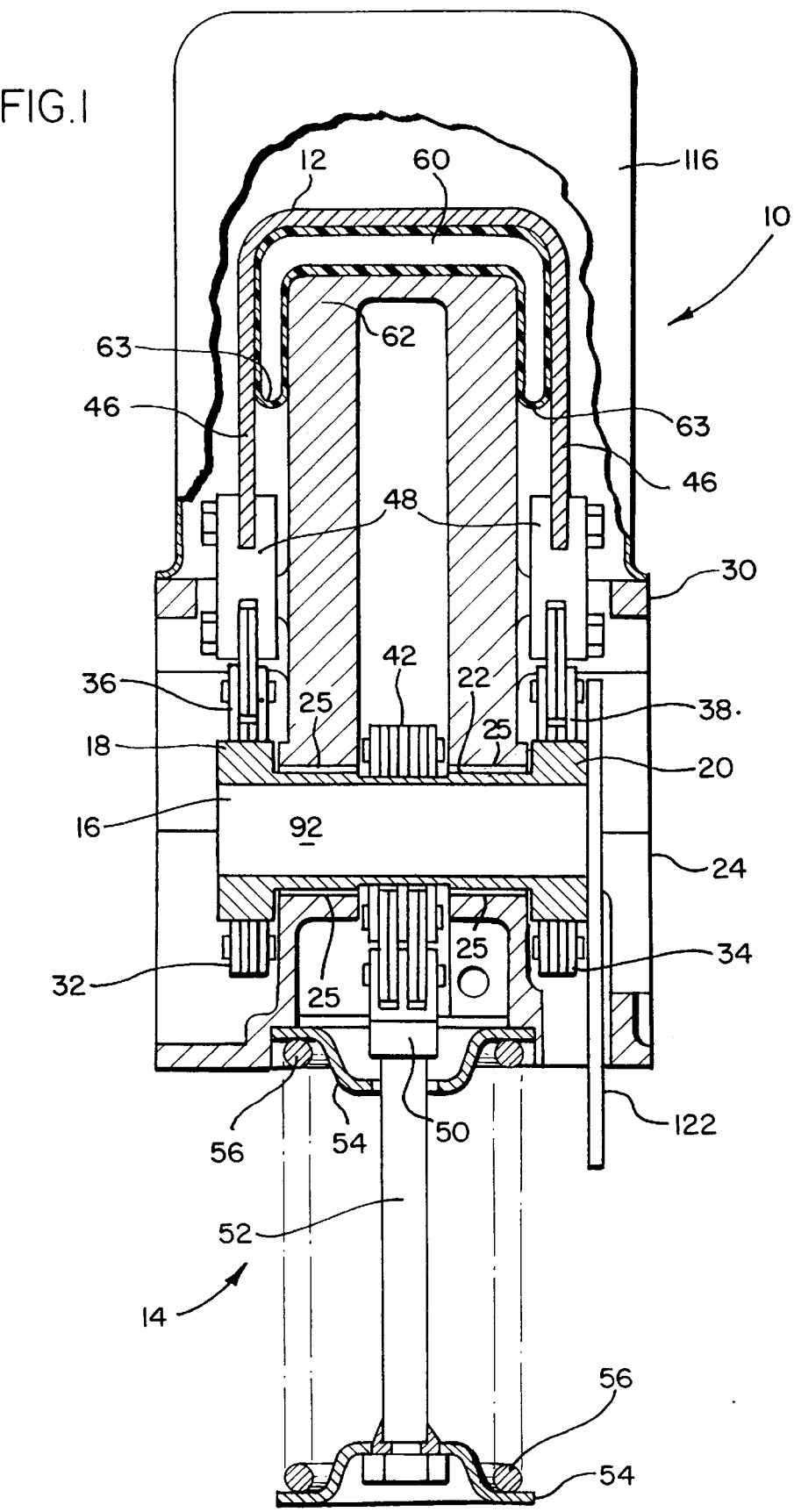
FIG. 1 is an elevational view, partly sectional, illustrating a rotary valve actuator constructed in accordance with the principles of the present invention, and with a canister cover at one end fragmented and a spring cartridge cover at the other end removed for convenience of illustration.

Respective canister linkage mounts 32, 34 project from the respective link flanges 18, 20 for mounting respective chain linkages 36, 38 to the canister 12 (see FIG. 1). A boss 40 projects from the lever middle section 22 for mounting chain linkage 42 to the spring cartridge 14.

The canister 12 includes a top portion 44 and depending side portions 46. A respective canister/chain connector 48 is mounted to respective opposite canister sides 46 at one connector end and at the other connector end to a respective chain linkage 36, 38.

Figure 3:
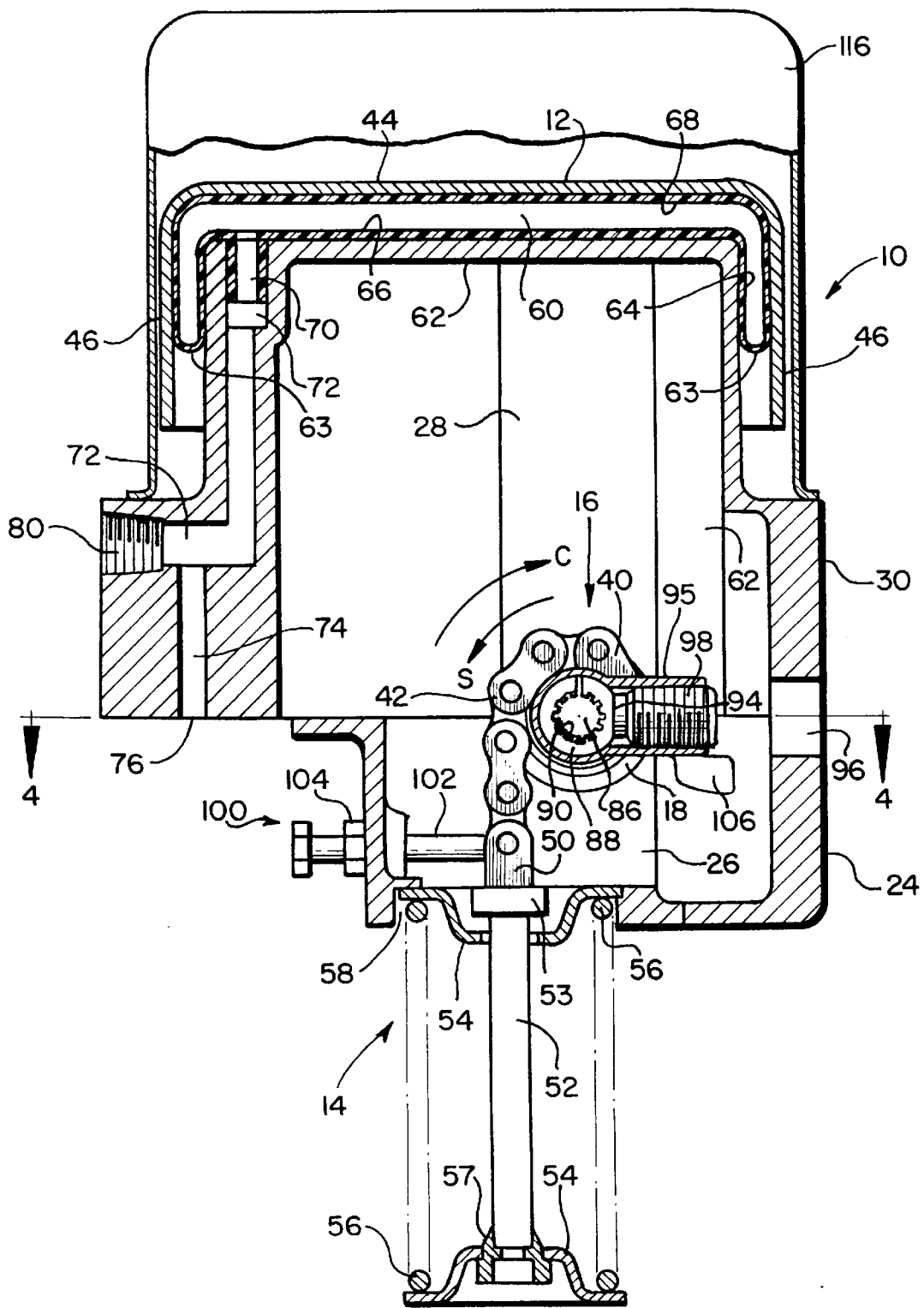
FIG. 3 is a left side elevational view, partly sectional, of FIG. 1 illustrating the rotary valve actuator with the spring cartridge cover removed.

With reference to FIG. 3, it can be seen that one end of the chain 42 is connected to the lever boss 40. The other end of chain 42 is mounted to a spring connector 50 which extends from a spring rod 52 within the spring cartridge 14. The spring cartridge 14 also includes opposite end plates 54 and a spring 56 mounted between the end plates 54. As can be seen in FIG. 3, spring rod 52 extends through a suitable aperture in the upper end plate 54 and is mounted by a split rod connector 57 at the grooved rod end to the lower end plate 54. The upper end of the spring cartridge 14 is nested within a spring cavity 58 provided within the housing 24.

A sealed, expandable bladder unit 60 is provided between canister 12 and an upstanding dome section 62 of the frame 30. The bladder 60 preferably is a sealed, preformed bladder unit formed of two pieces joined by heat sealing at a joint as disclosed in U.S. patent application Ser. No. 08/630,529, the disclosure of which is incorporated herein by reference.

Figure 6:
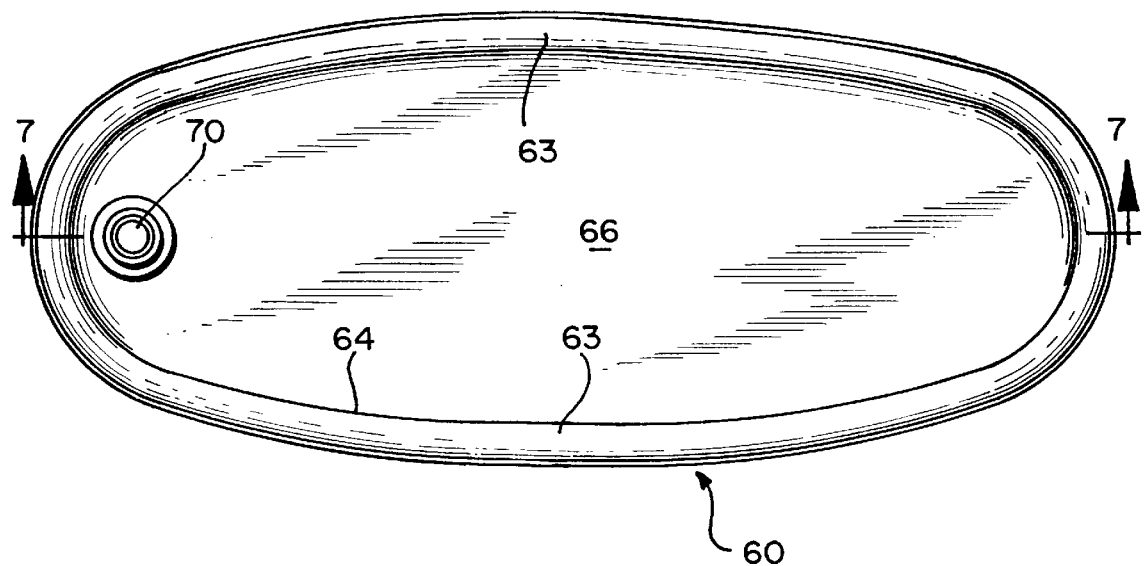
FIG. 6 is a plan view illustrating a bladder used in the rotary valve actuator of the present invention.
Figure 7:
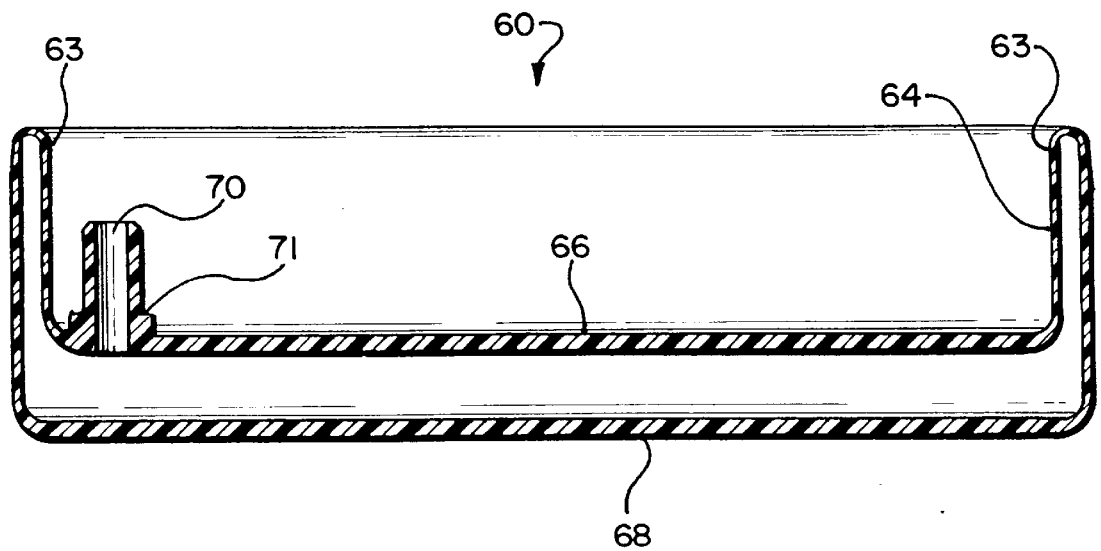
FIG. 7 is a sectional view taken along section lines 7—7 of FIG. 6.

Referring to FIGS. 3 and 6, it can be seen that the bladder 60 has an oval shape with an internal surface 64 which fits snugly around the dome shaped projection 62 in the initial deflated bladder condition. As shown in FIGS. 1 and 3, the bladder 60 is mounted on the dome 62 such that the inside bladder surface 64 at the bladder sides is immediately adjacent the dome 62 exterior sides, and with a bladder bottom surface 66 immediately adjacent the dome top surface of the dome 62. A bladder top surface 68 also lies immediately adjacent the canister top 44. Therefore, the expandable bladder 60 is trapped between the stationary housing dome 62 and the slidably movable canister 12.

The bladder may be formed of polyurethane with a cloth backing layer. For lower temperature usage the cloth backing layer is not required. The cloth backing layer, if used, surrounds the entire bladder and serves to reinforce the bladder material for use at high operating temperatures. At extreme upper temperatures, a thermopolyester plastic material such as Riteflex may be used for the bladder, with or without a cloth reinforcing layer.

The bladder is preferably preformed in the natural state to the smallest chamber size between the canister 12 and the top of dome wall 62. A bladder annular perimeter portion 63 is formed as a convolution of the bladder bottom surface 66. A cloth reinforcing layer can be placed on the exterior surfaces of the bladder by insertion during injection mold forming of the bladder. Alternatively, after injection molding of the bladder, the cloth can be applied thereto by suitable pressure and temperature conditions. A urethane layer can be used on a bias cut cloth prior to heat bonding to the bladder at a temperature of about 330° F. (166° C.) at 50 psi (345 Kpa) for about 1½ hours. Instead of applying a cloth layer on the entire bladder exterior, the cloth may be applied only to the annular perimeter portion 63.

The cloth reinforced, preformed bladder is then baked in an oven to stress relieve the material. It has been found that such stress relieving of the bladder in an oven can be accomplished at about 250° F. (121° C.) for about 24 hours.

To keep the bladder in place during actuator operation, upon assembly into the actuator, bonding adhesive beads may be applied above and below the bladder two-piece joint at the canister 12. Similarly the bladder can be bonded with a suitable adhesive to the top of the dome wall 62.

The bladder enables a rolling diaphragm action at the bladder perimeter portion 63 instead of an undesired balloon-type action during expansion of the bladder. As the valve actuator is operated by coupling fluid into the bladder chamber the bladder perimeter portion 63 in contact with the stationary dome side wall, merely rolls off of engagement with the stationary member while simultaneously increasingly engaging the side wall of the movable canister.

Thus, the bladder perimeter portion 63 is expanding in going from an initial unpressurized position to a pressurized position with the bladder perimeter portion merely moving from the inside diameter of the bladder to the outside diameter of the bladder in a rolling fashion placing the bladder material under tension. This significantly reduces bladder wear, increases the bladder life and enables repeated actuator operation over extended operating cycles and wide temperature and pressure ranges.

A bladder inlet tube 70 is inserted within a passageway 72 in housing 30 which passageway 72 leads to a connecting passageway 74 having an opening 76 at the bottom of frame 30 as seen in FIG. 3. The inlet tube includes a shoulder 71 for mounting an O-ring (not shown) to seal the bladder inlet within the passageway 72.

Passageway opening 76 communicates with an instrument 78, such as a pneumatic positioner (see FIG. 2) so that initiating pressurized expansion and contraction of the expandable bladder 60 is under control of the instrument 78 in a known manner. It is understood that the positioner 78 has been removed from FIG. 3 for convenience in illustrating other components of the rotary valve actuator 10. A plug 80 is inserted into the end of the passageway 72 during normal operations and may be removed from the passageway to gain access to the fluid passageway 72.

Figure 4:
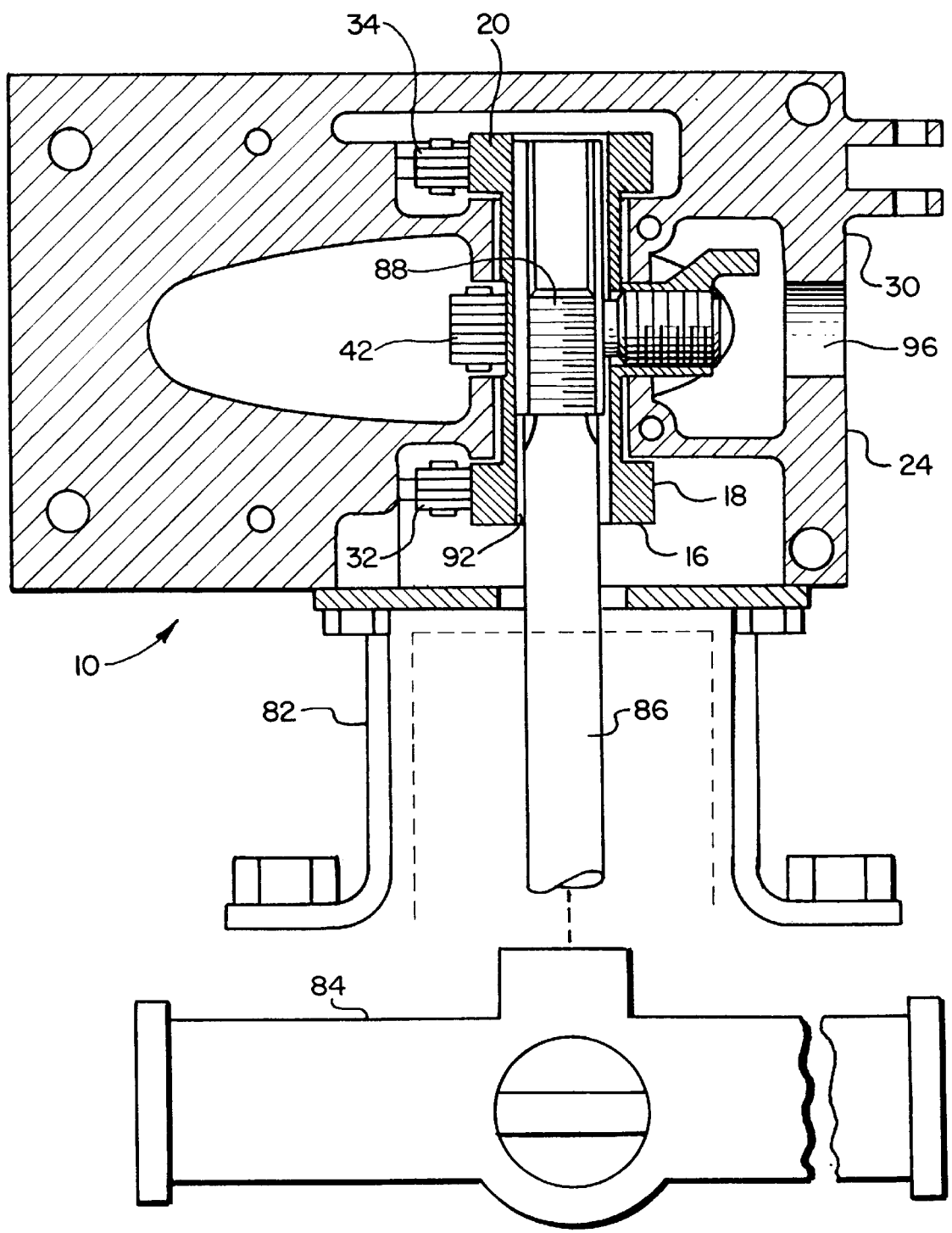
FIG. 4 is a partly sectional view taken generally along section lines 4—4 of FIG. 3, illustrating the rotary valve actuator operating a rotary shaft for actuating a fluid control valve.

With reference to FIG. 4, there is illustrated the rotary valve actuator 10 with a mounting bracket 82 which may be used to mount the valve actuator 10 to a fluid control valve 84, as schematically illustrated in FIG. 4.

Figure 10:
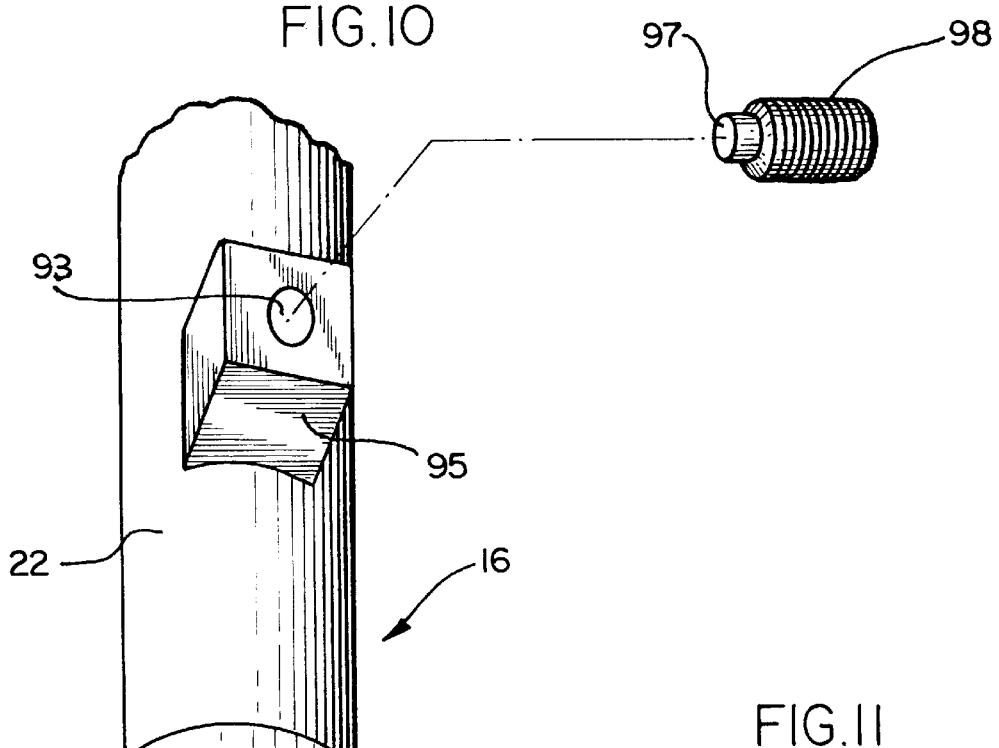
FIG. 10 is an exploded view illustrating a universal connection for the rotatable lever of FIG. 5 and a rotary valve shaft.
Figure 11:
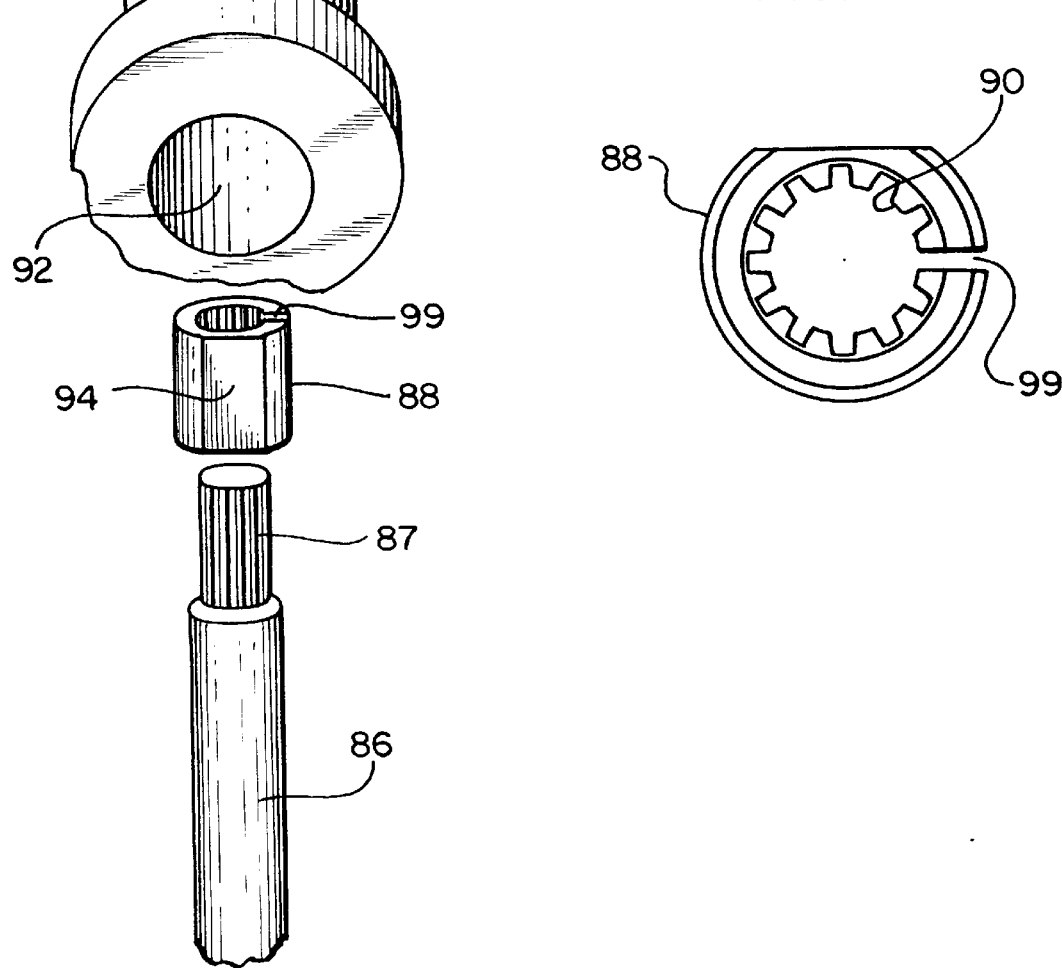
FIG. 11 is an end view illustrating a splined sleeve connector of FIG. 10.

Reference may also be made to FIGS. 10, 11 which illustrate a universal connection between the lever 16 and the valve shaft 86 in accordance with the present invention. A valve shaft 86 includes a splined end 87 so as to be rotatably driven by the rotating lever 16 with very little if any lost motion between the rotating lever 16 and the valve shaft 86. Providing this lost motion connection is a splined sleeve 88 having interior splines 90 matching the splines 87 on the end of shaft 86. The sleeve 88 has an outer diameter adapted to the lever bore 92 and slightly less than the bore diameter, and further includes a flat section 94. A shaft mounting projection or boss 95 having an internal threaded bore 93 extends from the lever middle section 22. The lever is rotated so the projection 95 is placed opposite an access hole 96 provided in the lower housing 24 as shown in FIG. 3. The sleeve 88 placed onto the splined end 87 is inserted into the lever bore 92 and the sleeve flat section 94 is positioned opposite the threaded bore 93 and the access hole 96 in the lower frame 24. A threaded set screw 98 known as a "dog point set screw" includes a corresponding flat front end 97 for locking engagement with the flat section 94 of the sleeve 88.

With the valve shaft and sleeve positioned within lever bore 92 such that the sleeve flat section 94 is aligned with the threaded bore hole 93 provided through the mounting projection 95 and into the interior of the lever 16 at the bore 92, the flat front end 97 of the set screw 98 threadably engages the bore. The threaded set screw 98 is mounted into the projection 95 until the set screw flat face 97 lockingly engages the flat section 94 of the sleeve 88 to thereby secure the splined sleeve 88, and the splined end 87 of shaft 86. This ensures that the valve shaft 86 will rotatably move with the lever 16 with very little, if any, lost motion between the shaft and lever. The sleeve 88 may be split at a split line 99 along the sleeve length to provide a secure connection to the shaft and lever as the set screw 98 is tightened onto the sleeve.

Rather than a cylindrical shaped lever bore 92, a square triangular, or other shaped bore can be used in this universal connection along with a similarly shaped exterior of sleeve 88. This universal connection enables one complete rotary valve actuator 10 with one size rotatable lever 16 to be assembled and used with several different sizes of rotary valves. Only a new sleeve 88 needs to be provided matched to the respective valve shaft splines 87 of a particular rotary valve.

Respective adjustable stops are provided for the movement of the spring as well as the sliding canister. With reference to FIG. 3, there is illustrated a canister top position adjustable stop 100 which includes a threaded stop rod 102 threadably engaged within housing 24 and which can be locked into position by a locking nut 104. A pawl 106 extends from the mounting projection 95 so as to rotate with the position of lever 16. As can be seen in the notations provided on FIG. 3, linear upward movement of the canister 12 during expansion of the bladder 60 rotates the lever 16 in a clockwise direction, which is indicated by the reference arrow and notation "C". In FIG. 3 there is also provided a notation indicating the direction of rotation of the lever 16 under pulling action of the spring 56, which reference arrow notation is marked "S". Accordingly, as the canister 12 moves linearly upwardly in response to the expanding bladder, the pawl 106 rotates clockwise until engaging the end of the stop rod 102. Stop 100 therefore sets the uppermost or top position of the canister 12. The stop position may of course be adjusted by unlocking nut 104 and threadably adjusting rod 102 until the desired uppermost canister position is reached.

Figure 2:
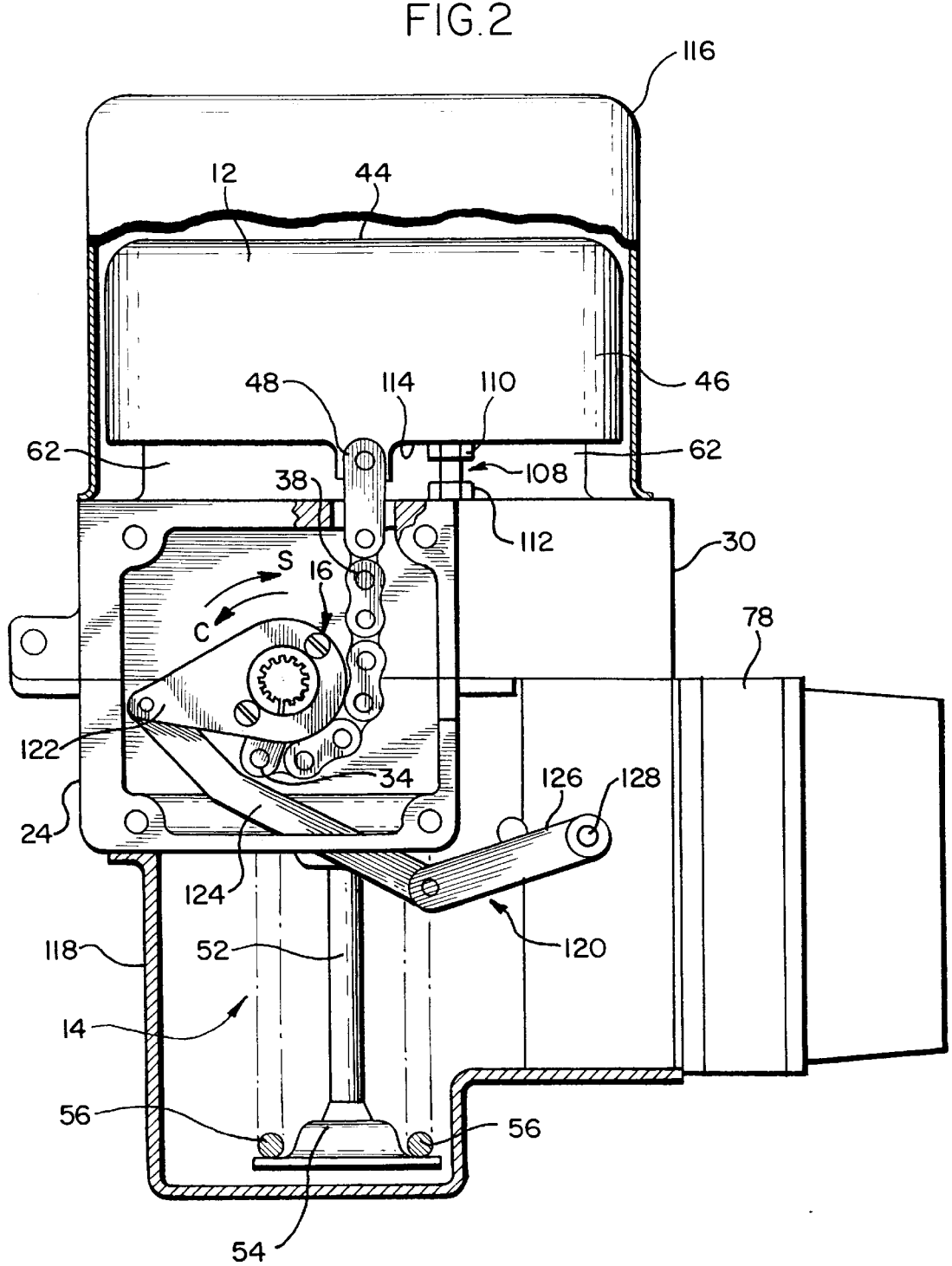
FIG. 2 is a right side elevational view, partly sectional, of FIG. 1 illustrating the rotary valve actuator with a direct mounted valve positioner and a spring cartridge cover assembled in position.

Referring to FIG. 2, a respective canister bottom position-adjustable stop 108 provided on opposite canister sides includes a threaded stop bolt 110 which is threadably engaged into the housing 30 and can be locked into position using a locking nut 112. The spring 56 tends to pull the canister 12 downwardly in FIG. 2, which rotates lever 16 in the illustrated clockwise direction "S" until the bottom end 114 of the canister engages the threaded stop bolt 110. The stops 108 therefore sets the lowermost or bottom position of the canister 12. The position of the adjustable stop 108 can readily be changed by unlocking nut 112 and threadably adjusting the position of stop bolt 110.

A canister cover 116 is provided for completely covering the canister 46, chain connector 48, and adjustable stops 108. The cover 116 may be suitably detachably mounted to the top of the housing 30. Similarly, a spring cartridge cover 118 may be suitably detachably mounted to the lower housing 24 to cover the spring cartridge 14.

With reference to FIG. 2, there is illustrated a feedback linkage 120 interconnecting the positioner 78 to the rotatable lever 16. A feedback arm 122 is connected such as by screws to the lever flange 20 so as to rotate with the lever 16. A bent linkage 124 is pivotably connected at one end to the feedback arm 122 and with the other bent linkage end passing through a slot in the housing 24 to pivotably engage a straight link arm 126, which in turn is connected to a rotating shaft 128 in the positioner 78. It is to be understood that the valve positioning instrument 78 can be a digital valve controller, such as a communicating, microprocessor-based current to pneumatic instrument. In addition to the normal function of converting a input current signal to a pneumatic output pressure, the digital valve controller, using a communications protocol, can provide easy access to information critical to process operation. Thus, one can gain information from the principle component of the process, i.e. the fluid control valve 84, using a compatible communicating device at the control valve or at a field junction box, or by using a personal computer or operator counsel within a control room. Alternatively, the instrument can be an analog device or a pneumatic positioner.

As can be seen in FIG. 2, the feedback linkage 120 has one end mounted to the rotating shaft 128 on a positioner 78 and another end mounted via the feedback arm 122 to the actuator rotating lever 16. Because the lever 16 is interconnected with the rotating valve shaft 86, the position of the valve shaft is sensed by the positioner 78 through the feedback linkage 120.

Assembly of the components of the pull-pull rotary valve actuator 10 illustrated in FIGS. 1–7 is readily provided in the following manner. Initially, the bladder 60 is snugly mounted atop the dome 62 on the upper housing member 30. The spring cartridge 14 is inserted into the spring cavity 58 on the lower housing 24. The spring cartridge 14 is then mounted to the lever using appropriate nuts and bolts fasteners to interconnect the spring chain linkage 42 to the spring connector 50 at one end and to the lever boss 40 at the other end. The two canister chain links 36, 38 are then connected to the respective lever linkage mounts 32, 34 at one end and to the respective chain connectors 48 at the other end.

The lever 16 may now be emplaced onto the support columns 26 with suitable bearings. Next, upper housing 30 is mounted onto the lower housing 24 and the housings are secured together. The canister chain links 36, 38 are then connected to the respective canister sides using respective canister connectors 48 and suitable fasteners. The positioner 78 is then mounted to the housing 30 and the feedback linkage 120 is interconnected between the lever 16 and the positioner. Thereafter, the covers 116, 118 can be mounted and the mounting bracket 82 as well, if desired.

The initial positioning of the canister and spring with respect to the adjustable stops is accomplished as follows. Initially, the spring 56 in the spring cartridge 14 is precompressed to a predetermined load, and the spring cartridge is inserted into the housing and connected to the lever as described. Then the spring 56 is preloaded with the linkage so the spring block 53 on the spring rod 52 is moved off of the top end plate 54 as shown in FIG. 3. Next the bladder is pressurized to move the canister up sufficiently so the two adjustable stops 108 can be mounted to the housing 30. Both travel stops 110 are then adjusted so that the sliding canister 12 bottoms evenly against the stops before reaching the end of its travel in the downward direction and so there is still tension maintained in the linkage (see FIG. 3). This sets the canister bottom position.

Note in FIGS. 2 and 3 that as the spring 56 pulls on the linkage 42 it will rotate the lever 16 in the reference direction "S" and at the same time pull the sliding canister 12 downward against the adjustable travel stops 110. Also, FIG. 2 and 3 show the reference direction "C" as the upwardly moving canister 12 pulls on linkage 36, 38 and at the same time compresses the spring.

When air pressure is supplied through openings 76, passageways 74, 72 and into the bladder 70, the pressure will expand the bladder 60 and force the sliding canister 12 in a linear upward movement which correspondingly rotates the lever 16 in the clockwise direction "C" as shown in FIG. 3. The adjustable stop 100 is adjusted to restrict the uppermost travel of the sliding canister 12 and ensure that the desired control valve position is reached.

Several advantages are afforded by the pull-pull rotary valve actuator 10 as shown in FIGS. 1–7. The linear upward movement of canister 12 under the pressure of the expanding bladder 60 rotates the lever 16 and causes the spring 56 to compress and resist the pull from the sliding canister. This pull-pull action maintains the chain linkages 36, 38, 42 in substantially constant tension i.e., with about only a 3% variance in torque. As the pressure is released from the bladder 60, the spring 56 pulls the sliding canister 12 back towards the adjustable stops 110. This pull-pull configuration in the actuator continually takes any lost motion out of the connecting linkage due to wear caused by cycling, and further eliminates the need for precision mated parts, since all mating parts are kept in tension. Also, because the spring 57 is mounted separately from the sliding canister 12, this allows the lever arm for the spring (in FIG. 5 measured radially from the centerline of lever 16 to the connection point on boss 40) to be shorter for the spring than the lever arm for the sliding canister (as measure in FIG. 5 radially from the centerline of the lever 16 to the connection point on linkage mounts 32, 34). A shorter lever arm reduces the spring travel and in return reduces the spring height, making the actuator smaller, lighter, and less costly. Furthermore, it may be noted that since the spring and canister are substantially in-line at 180° opposite positions with respect to the lever, and with the connecting linkage to the lever in a pull-pull maintained tension condition, the amount of bearing forces exerted on the support columns 26, 28 and the associated bearings during driving rotation of the lever 16 is significantly reduced. Using flexible linkage chains 36, 38, 42 provides the lever arm (either the spring lever or the canister lever arm) to always be the same respective distance from the center of the lever through the 90° rotation of the lever. Thus, the flexible linkage produces constant torque through the 90° rotation of the lever and is therefore desired over rigid linkage which produces a variable torque over the rotatable position of the lever.

Referring now to FIGS. 8 and 9, there is illustrated an alternative embodiment of a right angle rotary valve actuator 130 which includes operating components of the sliding canister, bladder, spring cartridge, and lever identical to the same components with respect to the previously described in-line rotary valve actuator 10 of FIGS. 1–7. As can be seen from FIG. 8, rather than the in-line configuration of prior described rotary valve actuator 10, the rotary valve actuator 130 provides the return spring cartridge 14 configured 90° to the center line of the sliding cartridge 12. This tends to reduce the size, number of parts and corresponding cost of the actuator. However, because the spring cartridge 14 is angularly positioned with respect to the center line of the sliding canister 12, (rather than in-line positioning in actuator 10) this creates a diagonal load on the bearings of the rotating lever 16 of the actuator 130.

It must be recognized, however, that the rotary valve actuator 130 also provides pull-pull tension of the linkages 36, 38, 42 between the canister 12, lever 16 and spring cartridge 14, thus maintaining the linkage in constant tension. Therefore, the many significant advantages afforded by the pull-pull, inline rotary valve actuator 10 are also accomplished by the pull-pull, 90° rotary valve actuator 130.

The foregoing detailed description has been given for clearness of understanding only, and no unnecessary limitations should be understood therefrom, as modifications will be obvious to those skilled in the art.

What is claimed is:

1. In a rotary valve actuator for a fluid control valve having a valve operating shaft with a splined end, the rotary valve actuator having a rotatable lever, an improved rotary actuator driving connection between said rotatable lever and said valve shaft splined end comprising:

a hollow bore in said rotatable lever;
a sleeve having an exterior surface substantially matching said hollow bore for insertion into said bore and a hollow interior surface adapted to receive said valve shaft splined end; and
a set screw threadably engaging said rotatable lever and securely engaging said sleeve exterior surface for locking said sleeve onto said valve shaft splined end and providing a driving connection between said rotatable lever and said valve operating shaft.

2. The improved rotary actuator driving connection of claim 1, wherein said sleeve exterior surface includes a flat portion for engagement with said set screw.

3. The improved rotary actuator driving connection of claim 2, wherein said set screw includes a flat front end for engagement with said sleeve flat portion.

4. The improved rotary actuator driving connection of claim 1, wherein said rotatable lever includes a raised boss with said set screw threadably engaging said raised boss.

5. The improved rotary actuator driving connection of claim 4, wherein said sleeve exterior surface includes a flat portion positioned adjacent said raised boss for engagement with said set screw.

6. The improved rotary actuator driving connection of claim 5, wherein said set screw includes a flat front end for engagement with said sleeve flat portion.

7. The improved rotary actuator driving connection of claim 6, wherein said sleeve is split through said exterior surface.

* * * * *